July 28, 1936.   F. M. YOUNG   2,048,834
GYROSCOPIC POSITION FINDER
Filed Nov. 7, 1931   9 Sheets-Sheet 1

INVENTOR.
Fletcher M. Young
BY
White, Prost, Flehr & Lothrop
ATTORNEYS.

July 28, 1936.                F. M. YOUNG                  2,048,834
                       GYROSCOPIC POSITION FINDER
                   Filed Nov. 7, 1931        9 Sheets-Sheet 3

INVENTOR.
Fletcher M. Young
BY
ATTORNEYS.

July 28, 1936.  F. M. YOUNG  2,048,834
GYROSCOPIC POSITION FINDER
Filed Nov. 7, 1931  9 Sheets-Sheet 4
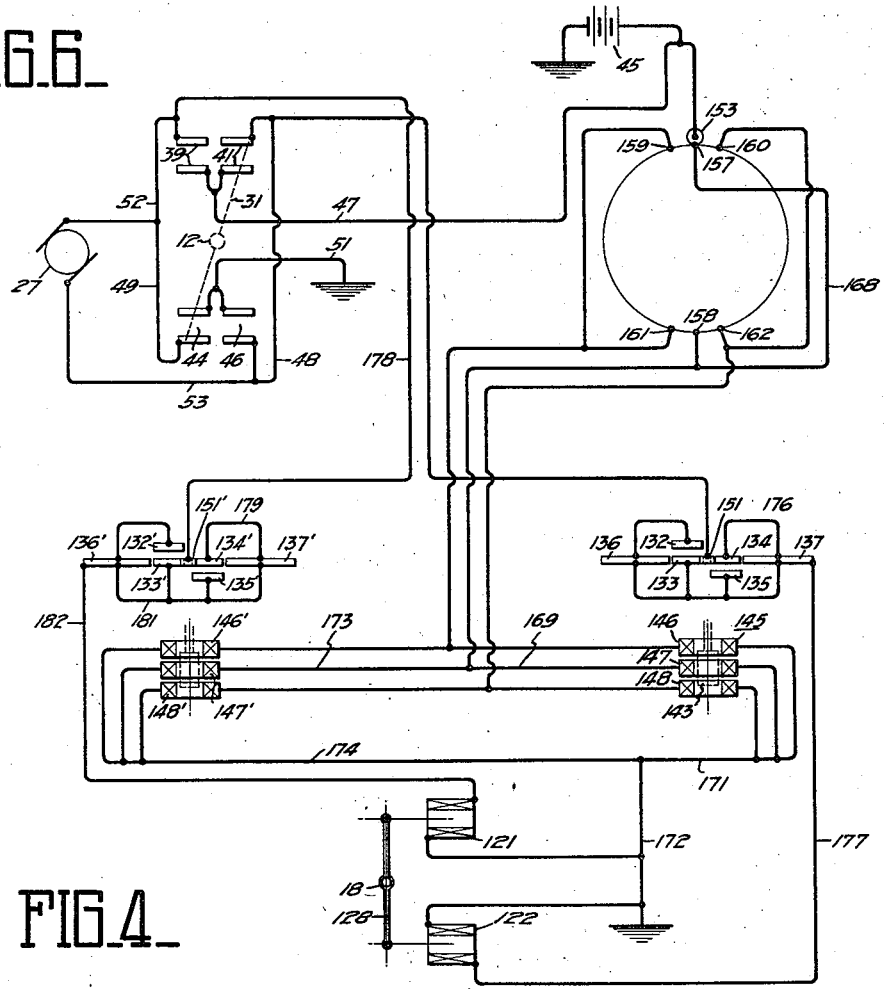
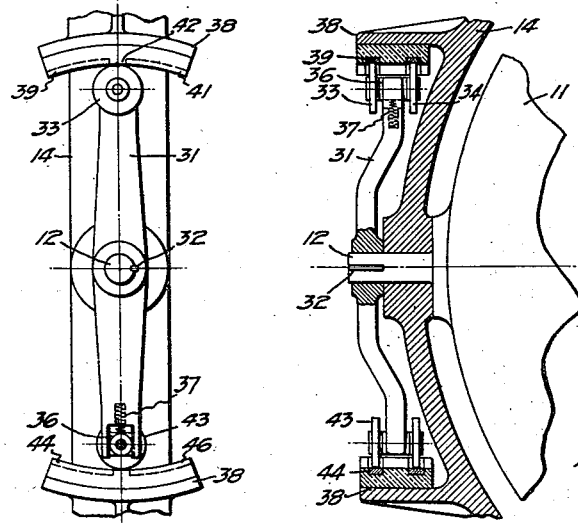
INVENTOR.
Fletcher M. Young
BY
ATTORNEYS.

July 28, 1936.　　　F. M. YOUNG　　　2,048,834
GYROSCOPIC POSITION FINDER
Filed Nov. 7, 1931　　　9 Sheets-Sheet 5
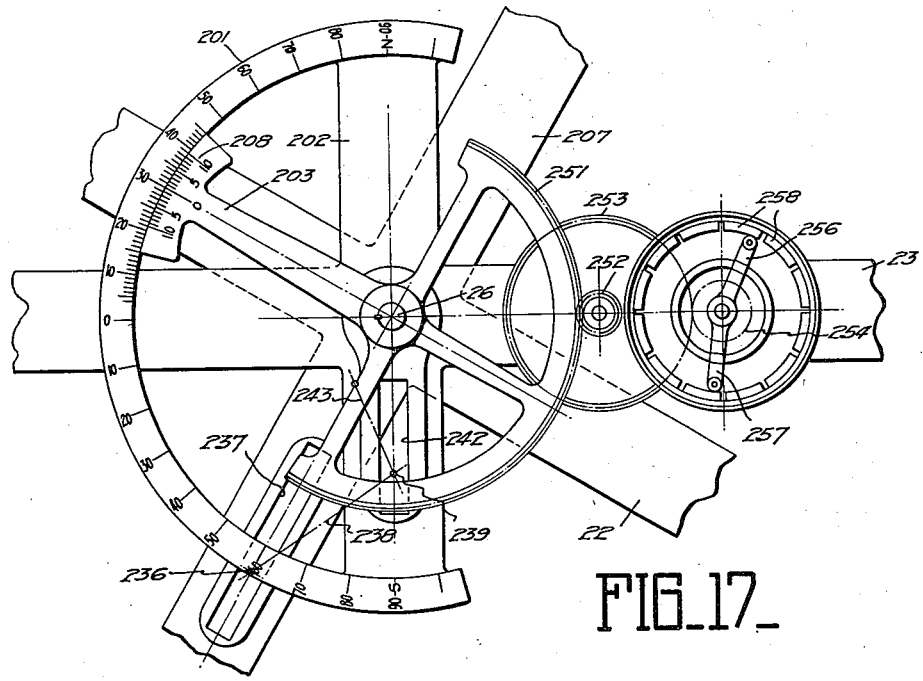
FIG_17_
FIG_7_
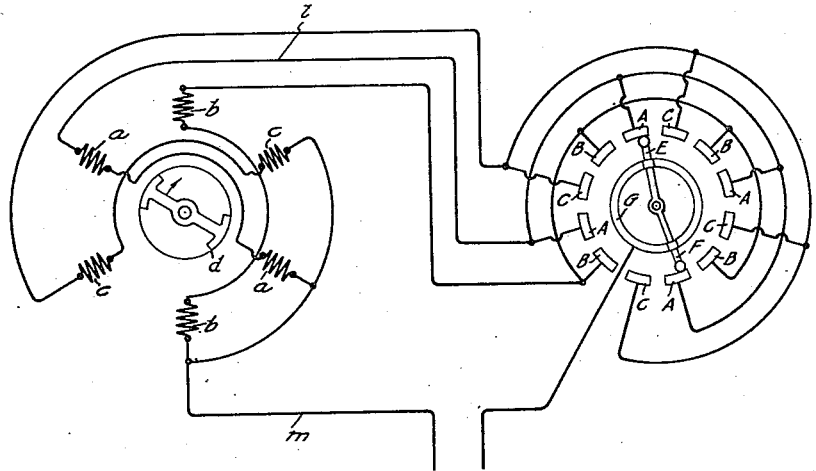
INVENTOR.
Fletcher M. Young
BY
ATTORNEYS.

July 28, 1936.  F. M. YOUNG  2,048,834
GYROSCOPIC POSITION FINDER
Filed Nov. 7, 1931  9 Sheets-Sheet 6
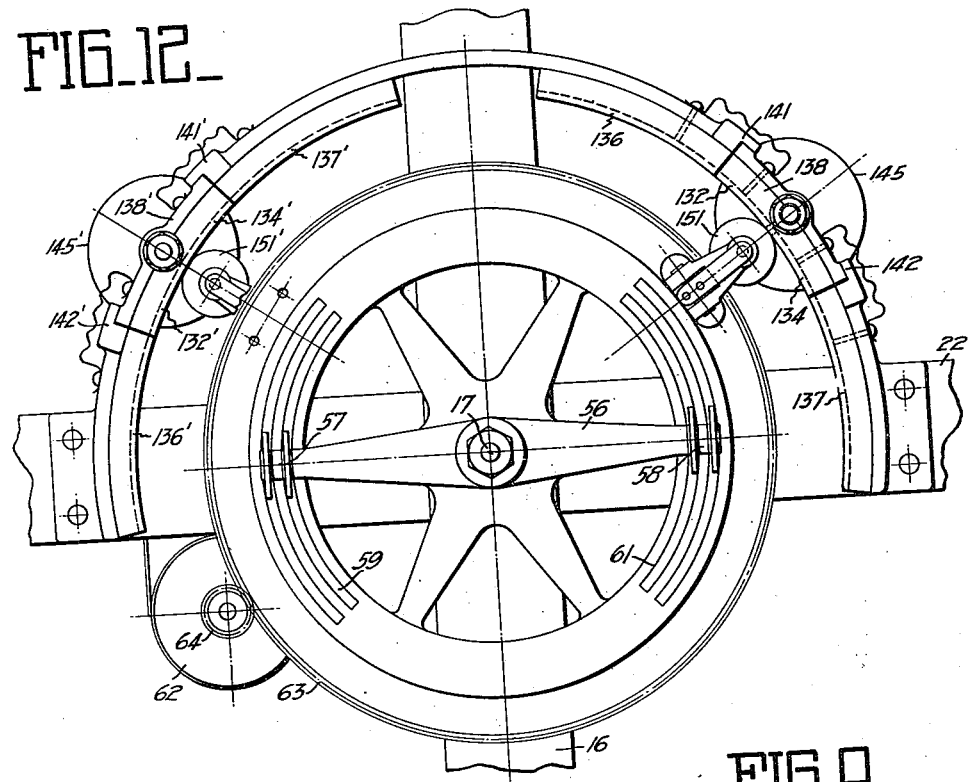
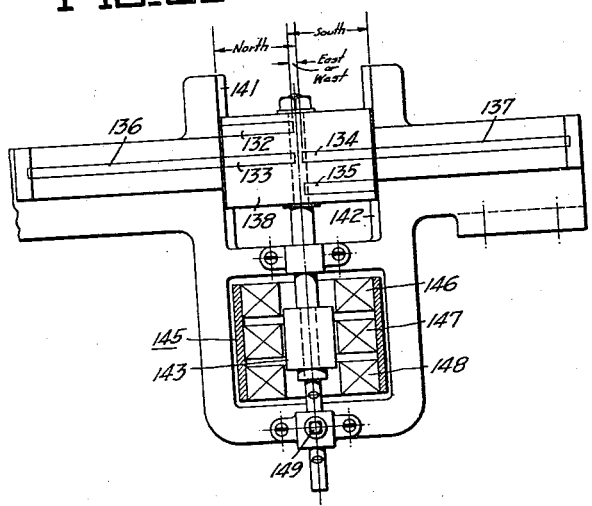
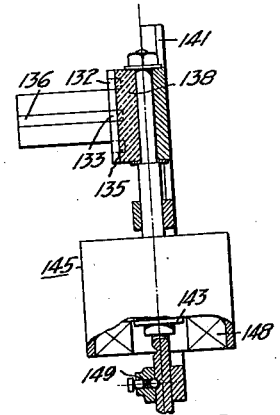
INVENTOR.
Fletcher M. Young
BY
White, Prost, Hehr & Lothrop
ATTORNEYS.

July 28, 1936.  F. M. YOUNG  2,048,834
GYROSCOPIC POSITION FINDER
Filed Nov. 7, 1931  9 Sheets-Sheet 7
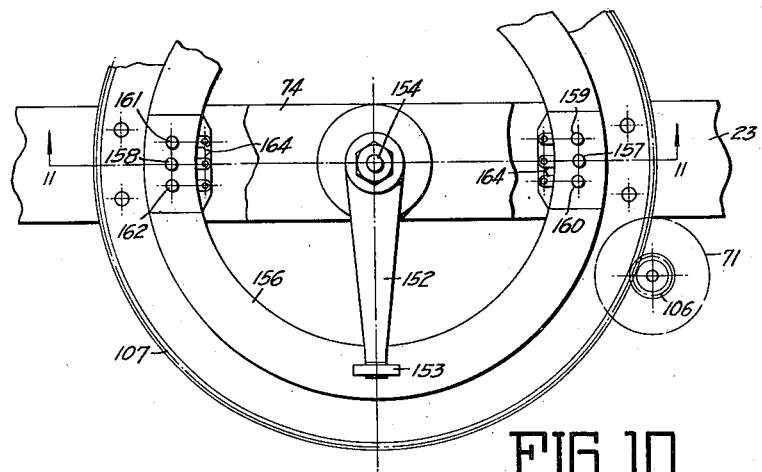
FIG_10_
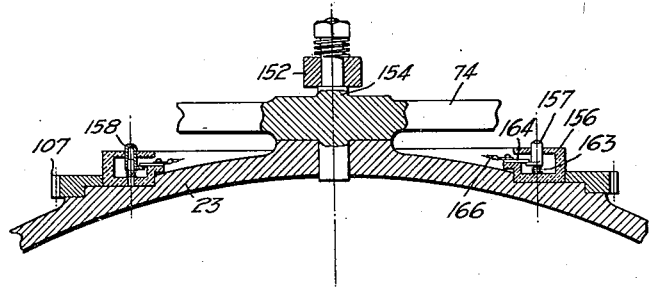
FIG_11_
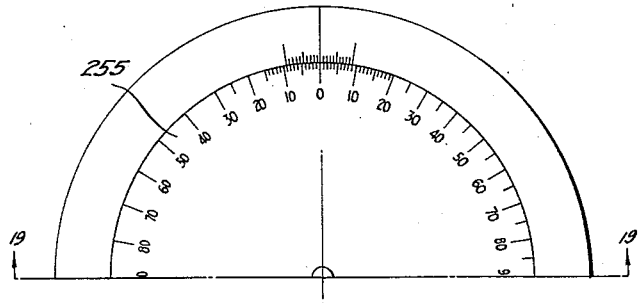
FIG_18_
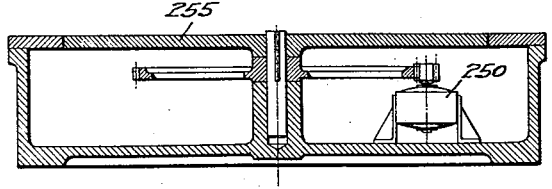
FIG_19_
INVENTOR.
Fletcher M. Young
BY White, Prost, Hehr & Lothrop
ATTORNEYS.

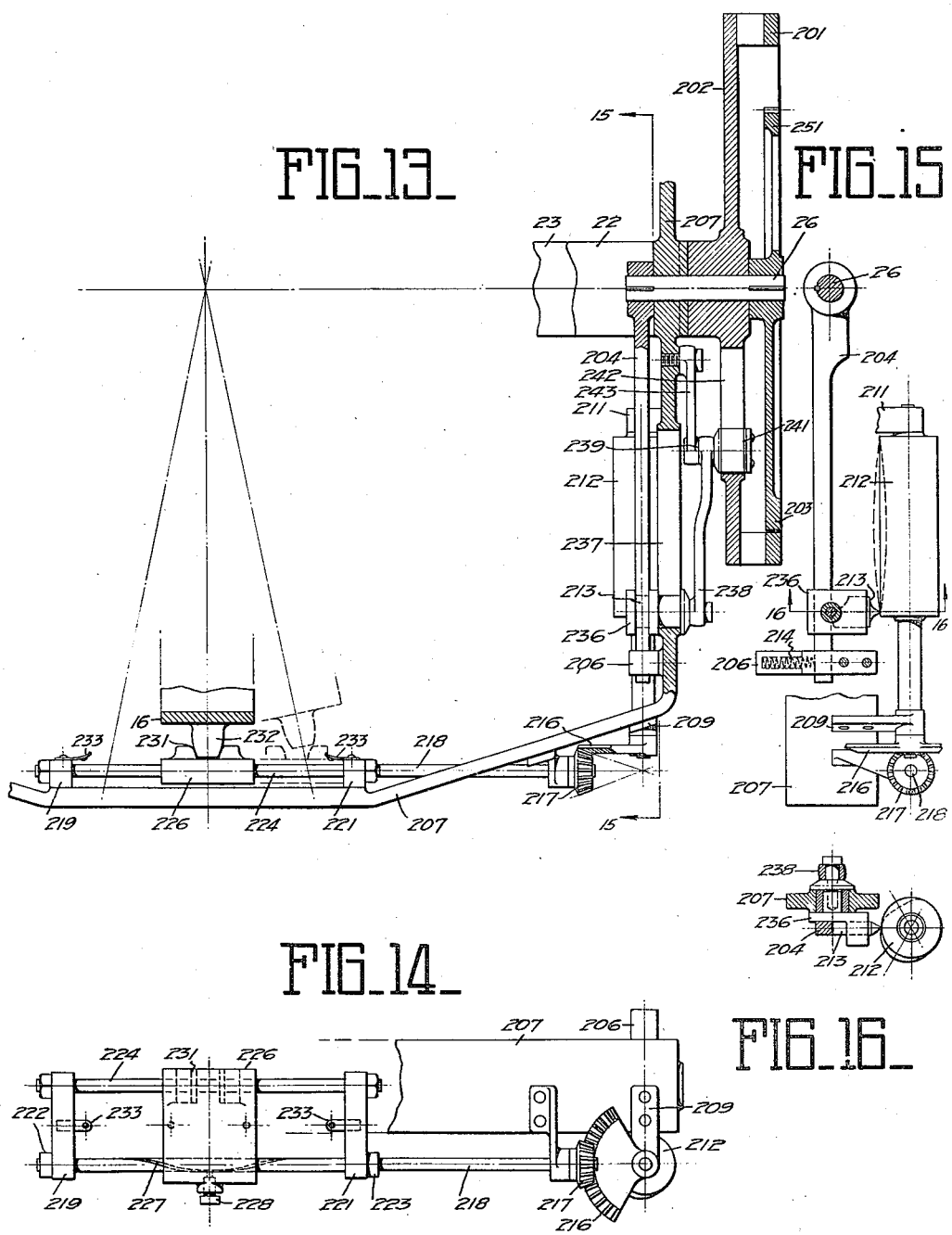

July 28, 1936.  F. M. YOUNG  2,048,834

GYROSCOPIC POSITION FINDER

Filed Nov. 7, 1931  9 Sheets-Sheet 9

INVENTOR.
Fletcher M. Young
BY
White, Prost, Hehr & Lothrop
ATTORNEYS.

Patented July 28, 1936

2,048,834

UNITED STATES PATENT OFFICE 2,048,834

GYROSCOPIC POSITION FINDER

Fletcher M. Young, Berkeley, Calif., assignor of one-half to Michael C. Casserly, San Mateo, Calif.

Application November 7, 1931, Serial No. 573,641

13 Claims. (Cl. 33—204)

My invention relates to position finders and more particularly it relates to a gyroscopic apparatus for automatically indicating geographic positions in terms of latitude. The position finder of the present invention is adapted to be used in connection with any known means of conveyance, and is applicable alike to vessels at sea, to land vehicles, or to air craft.

Heretofore, it has been proposed to employ gyroscopic means for indicating latitude, but such proposals were based on the erroneous presumption that a gyroscope, when once set in motion, will necessarily maintain its spinning axis fixed in space.

While it is true, that the spinning axis tends to remain fixed in space, this condition persists only as long as there is no external force acting on the gyroscope. Any gyroscope within the influence of the earth's gravitation, will be rotated with the earth, and the force of this rotation will have its effect on the direction of the spinning axis of the gyroscope and will cause the axis to precess under the influence of the applied force. Also, some frictional forces are necessarily present in any gyroscope system, and these forces will likewise disturb the direction of the spinning axis unless counteracted or compensated for. When the gyroscope is mounted on a moving body, such as a ship, numerous forces arising from the pitching and rolling of the ship, its change in course and its change in speed, all have their effect on the spinning axis of the gyroscope. Even the force resulting from the movement of the earth in its orbit may in time be felt by the gyroscope. Prior gyroscopic position finders have failed to counteract, to neutralize, or to eliminate any of these forces and for this reason have been entirely inoperative to produce the results sought. The mere fact that the tedious methods of dead reckoning and of resorting to astronomical observations are still universally employed in finding positions, is conclusive that no automatic position finder has heretofore been devised which is accurate within practicable limits.

It is an object of my invention to provide an automatic gyroscopic position finder which is accurate and dependable and which will afford a direct position indication which need not be translated by computation.

Another object is to provide means in apparatus of the character described for counteracting the effect of external forces.

Another object is to provide a gyroscopic position finder in which novel means is provided for minimizing and counteracting the effect of frictional forces.

Still another object is to provide a gyroscopic position finder in which a horizon instrument is employed for providing a basic plane from which the coordinates of the position can be derived.

Still another object is to provide a latitude indicating gyroscope in which possible errors due to external forces are eliminated, neutralized or counteracted.

These and other objects and advantages are obtained in the embodiment of my invention illustrated in the accompanying drawings, in which:

Figure 1 is a vertical cross section of the latitude indicating apparatus taken on an east-west plane and looking south as it appears when the device is at the Equator. The plane along which Fig. 1 is taken is indicated by the line 1—1 of Fig. 2.

Fig. 4 is an elevational view showing in detail a contact arm employed in certain follow up mechanism.

Fig. 5 is a vertical cross section of the detail shown in Fig. 4.

Fig. 6 is a circuit diagram showing certain ones of the electrical connections of the latitude device.

Fig. 7 is a circuit diagram of a repeater motor and an impulse transmitter by which its movements are controlled.

Figs. 8 and 9 are front and side elevational views, respectively, both partly in section, of certain automatic range limiting contacts employed in the latitude apparatus.

Figs. 10 and 11 are detail views of control mechanism for the range limiting contacts.

Fig. 12 is a detail view showing the relationship of certain parts of the latitude apparatus.

Figs. 13 to 16 are views showing in detail certain correcting mechanism for automatically compensating for the north steaming error in the latitude apparatus.

Fig. 17 is a detail view of the indicating dial of the latitude apparatus.

Figs. 18 and 19 are detail views of a latitude repeater card.

Figure 1:
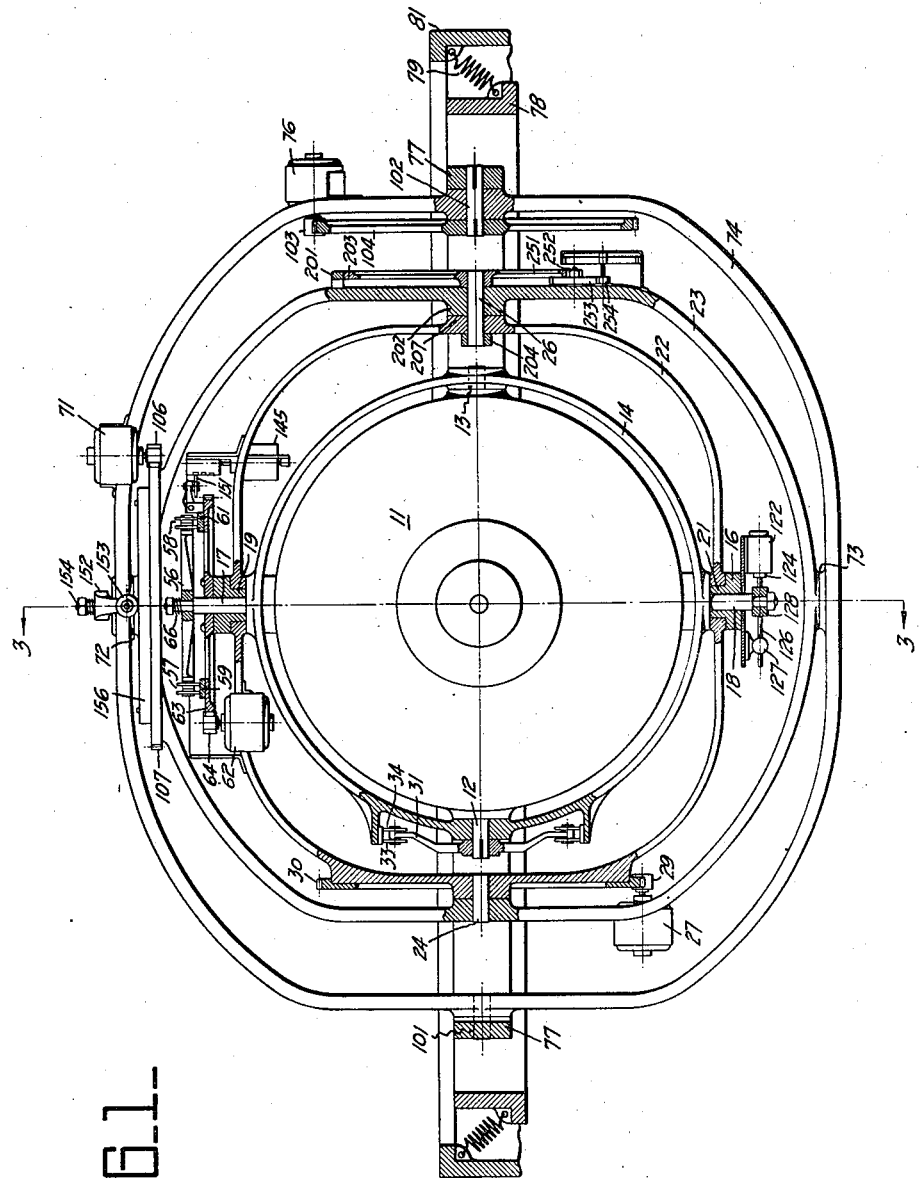

The latitude indicating gyroscope disclosed herein is set in motion with the plane of the gyroscope disc parallel with the plane of the Equator, and its spinning axis parallel to the polar axis of the earth. Means is provided for counteracting the effect of frictional forces and the effect of external forces due to movement of the earth and to movements of the ship or other means of conveyance on which the device may be mounted, so that the spinning axis is caused to remain relatively fixed in space. Under these conditions, the angle between the spinning axis of the latitude gyroscope and the earth's north and south horizontal will indicate the latitude of any geographic position into which the device may be moved. The force exerted upon the latitude gyroscope by the rotation of the earth tends to maintain the spinning axis parallel to the polar axis of the earth, and thus in the plane of the meridian. At the Equator the spinning axis of the latitude gyroscope is horizontal and parallel to the polar axis of the earth. The rotation of the earth, therefore, produces no rotation of the gyroscope system about the vertical and the axes being parallel will remain so. When the gyroscope is moved to a position north of the Equator, the north end of the gyroscope axis will show elevation above the horizontal by an angular amount equal to the latitude of the place. This is due to the effect of the force of the earth's rotation. This force can be resolved into two components, one causing the gyroscope to rotate about the horizontal and tending to bring the gyroscope axle parallel to the horizon, and the other causing the gyroscope to rotate about the vertical and tending to bring the gyroscope axle into coincidence with the vertical. The gyroscope axle, therefore, takes a position determined by the resultant of these two component forces. It can be shown that the angle which the axis of the gyroscope makes with the horizontal under the influence of these component forces is the angle whose tangent is the sine of the angle of latitude divided by the cosine of the latitude, which angle is exactly equal to the latitude itself. By measuring this angle, therefore, the latitude becomes known.

When the complete apparatus is mounted on a ship and the ship is moving over the surface of the earth, the resultant of the earth's movement and the movement of the ship determines the position of the spinning axis. If the ship is moving due east or due west, the axis of rotation of the gyroscope system about the earth is not affected, but when the ship moves in a northerly or southerly direction, the virtual axis about which the gyroscope system is rotated varies from the direction of the polar axis of the earth by an amount which is determined by the speed and the course of the ship. Assuming that the ship is steaming true north, the gyroscope system will be moved north at the same rate, while at the same time, it is carried east by the rotation of the earth. The resultant direction, therefore, in which the gyroscope is moved in space, is east by north, the northerly component being determined by the speed of the ship. Substantially the same effect would be produced if the gyroscope were rotated about an axis which is perpendicular to the plane of this resultant motion and passing through the center of the earth. The spinning axis of the gyroscope, therefore, tends to move into a position which is parallel to this virtual axis and will lie in the plane of the virtual meridian through this axis, instead of lying in the plane of the true meridian. Since the relationship between the virtual meridian and the true meridian can be determined from the speed and the course of the ship, however, the resulting discrepancies in the latitude indications can be compensated for, either automatically or by calculation, as may be desired.

A suitable apparatus for indicating longitude, which I prefer to employ with the latitude apparatus disclosed herein, is shown and claimed in my copending divisional application Serial No. 635,065, filed September 27, 1932.

Figure 2:
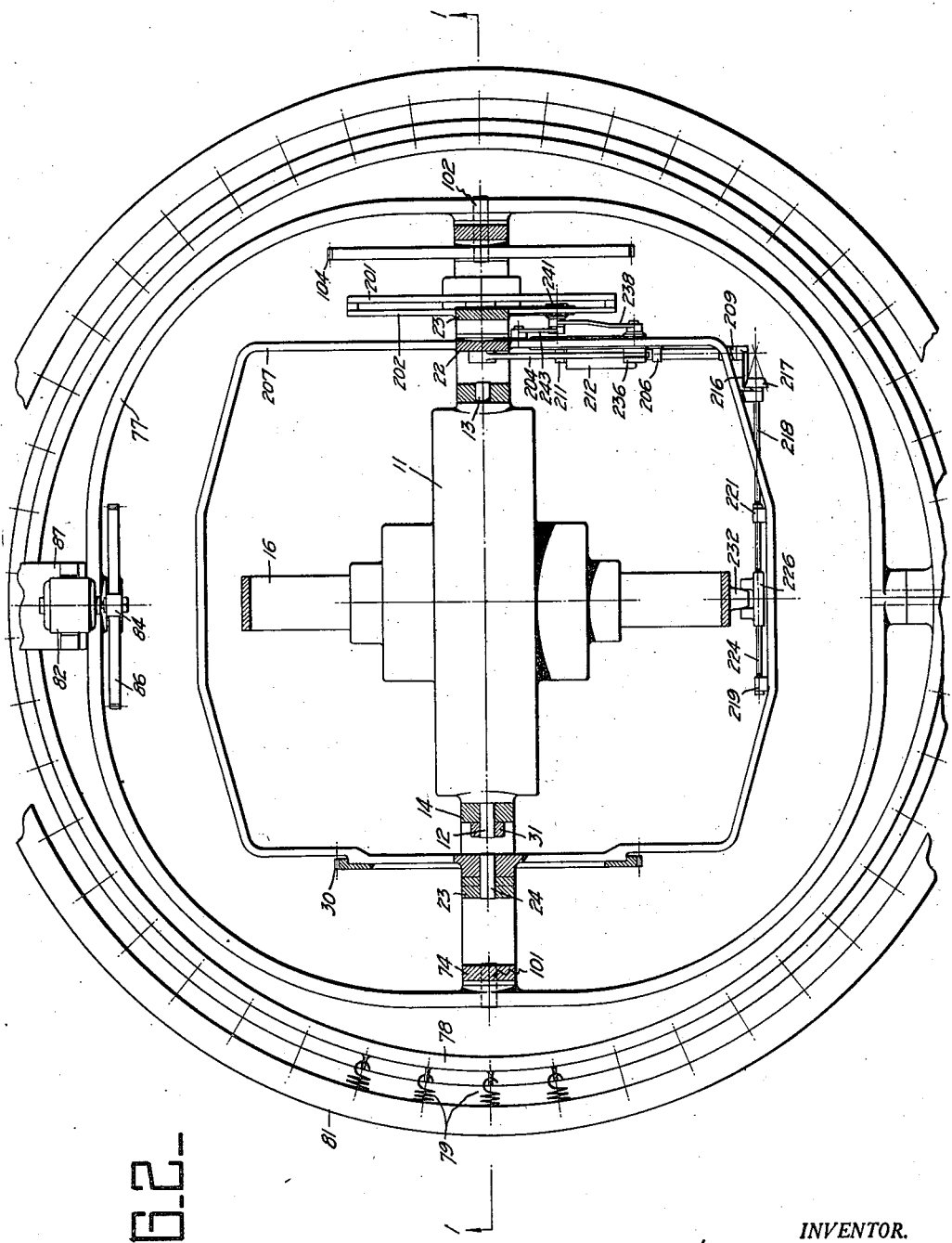
Fig. 2 is a plan view of the latitude apparatus, partly in section, with the parts in the position they assume at the Equator.
Figure 3:
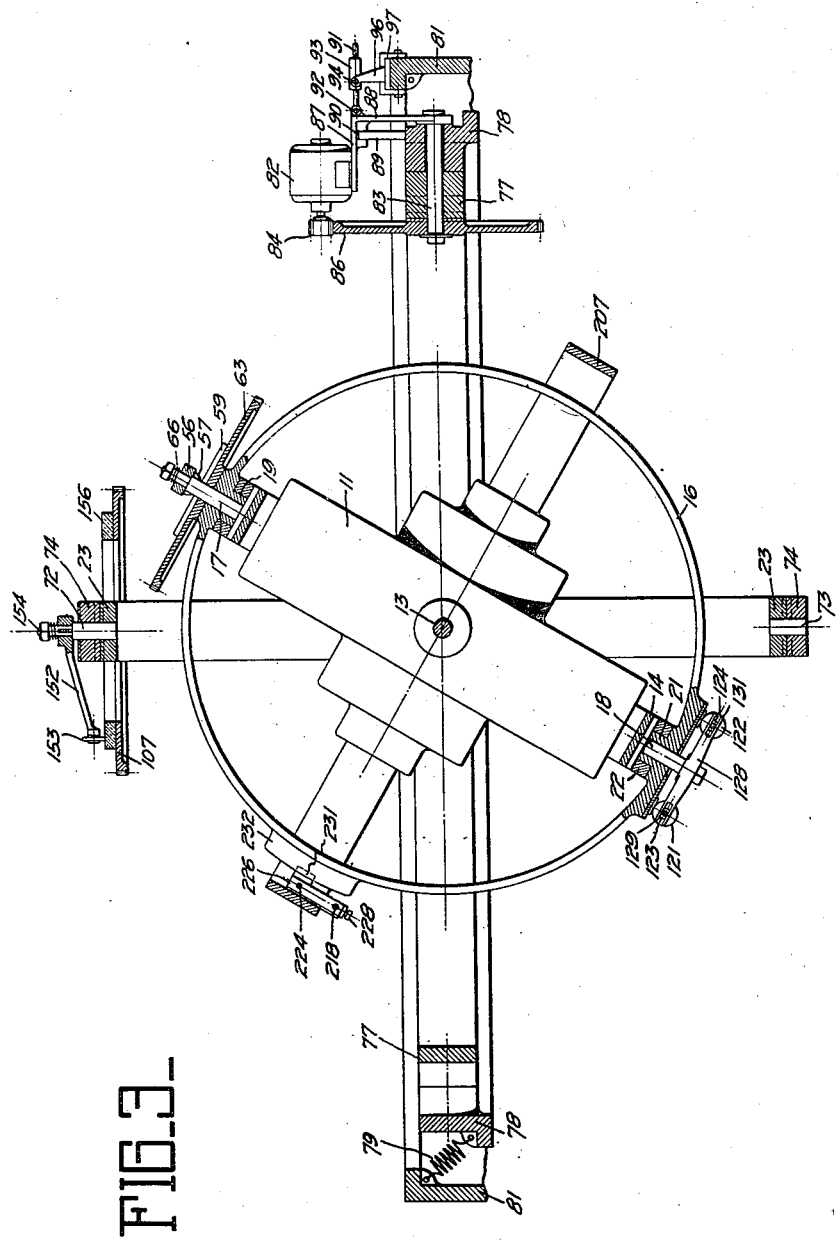
Fig. 3 is a cross sectional view taken along the plane indicated by line 3—3 of Fig. 1 with the parts in the position they assume at approximately 30° north latitude.

Referring now to the drawings, and first to Figs. 1, 2 and 3 thereof, I have illustrated the general assembly of the latitude indicating apparatus. A gyroscope having a housing 11 is provided, the spinning disc of the gyroscope being preferably electrically driven and mounted in a rarefied atmosphere in accordance with the well established practice. The gyroscope is preferably neutrally mounted, or free and non-pendulous, so that its spinning axis does not normally tend to assume a position horizontal with the surface of the earth. Preferably, the gyroscope is started with its disc parallel with the plane of the Equator, its spinning axis therefore being parallel with the axis of the earth. Under these conditions when the ship or other means of conveyance, on which the apparatus is mounted, is stationary or moving due east or west, the spinning axis will remain parallel to the axis of the earth under the influence of the directive force arising from the earth's rotation. On movement of the ship in a direction which has a northerly or a southerly component, a slightly different effect is produced, as will be explained hereinafter.

In Fig. 1 it is assumed that the ship on which the apparatus is mounted is at the Equator and headed north. The view shown in this figure is a vertical section taken on the east-west plane and looking south. Extending from the housing 11 are east and west trunnions 12 and 13 journaled in a ring 14 which surrounds the housing 11.

Ring 14 in turn is rotatably mounted in a ring 16 by means of trunnions 17 and 18 at right angles to the trunnions 12 and 13. Inwardly disposed collars 19 and 21 extending from ring 16 surround the trunnions 17 and 18 and form a bearing on their outer surfaces for rotatably supporting the ring 22. Thus, ring 22 is also mounted for rotation about the axis of trunnions 17 and 18.

Ring 22 in turn is rotatably supported in a ring 23 by means of east and west trunnions 24 and 26. Ring 23 is made to assume a position which is vertical and perpendicular to the plane of the meridian at all times by means which will subsequently be described in detail.

Means is provided for causing the ring 14 to assume a position in which it lies in a plane having a definite relationship with the plane of the gyroscope disc, preferably coincident therewith or at right angles thereto. In the embodiment illustrated, the ring 14 is made to lie in a plane coincident with the plane of the gyroscope disc and for accomplishing this object I have shown an electrically operated follow-up mechanism including an electric motor 27 rigidly mounted on the ring 23. A pinion 29 on the motor shaft meshes with a gear 30 fixed to the ring 22, so that as the motor rotates in one direction or the other, ring 22 is rotated about the trunnions 24 and 26, carrying with it the ring 14 which rotates about the trunnions 12 and 13. The amount of rotation thus imparted to the ring 14 and its direction are determined by a set of electrical contacts carried by the ring 14 and cooperating with contacts carried by an arm 31 rigidly secured to the trunnion 12 of the gyroscope housing 11.

The contact arm 31 can have the construction shown in detail in Figs. 4 and 5. Preferably, the arm 31 is made of insulating material, such as bakelite, and is keyed to the trunnion 12, as by means of a feather 32. The upper end of arm 31 carries a pair of conducting contact wheels 33 and 34, preferably made of gold or other corrosion resisting metal. The wheels 33 and 34 are electrically connected together by a bar 36 on which they are mounted. A suitable spring 37 can be recessed in the end of arm 31 for biasing the wheels in a direction against a contact carrying member 38 mounted on the ring 14. Member 38 carries a set of four contacts arranged in pairs 39 and 41, the pairs of contacts being separated from one another by a relatively narrow insulating segment 42. Relative movement between the plane of the gyroscope disc and the plane of the ring 14 causes the arm 31 to move the contacts 33 and 34 thereon so that they bridge either the pair of contacts 39 or the pair of contacts 41. The lower end of arm 31 carries a pair of similar contact wheels 43 which are adapted to cooperate with pairs of contacts 44 and 46 carried by the ring 14.

This contact mechanism controls the energization of motor 27 in such a manner that it causes the ring 14 to follow and to maintain the same plane as the gyroscope disc. The parts are so arranged that when the contact wheels carried by arm 31 rest on the insulating segments 42, the plane of the ring 14 and the plane of the gyroscope disc are coincident and under this condition the circuit to the motor 27 is open, thereby allowing the ring 14 to remain in this position. When there is relative movement between the plane of the gyroscope disc and the plane of the ring 14, however, motor 27, which is of a suitable reversible type, is energized to rotate in one direction or the other to move the ring 14 back into the plane of the gyroscope disc. The circuit for effecting this control is shown in the upper left hand portion of Fig. 6. In one direction of relative movement between the ring 14 and the gyroscope disc the pair of contacts 41 and the pair of contacts 44 are bridged by the contact wheels carried by arm 31. A circuit is then completed from a grounded battery 45, or other source of current, through line 47, contacts 41, line 48, though the motor 27, line 49, contacts 44 and conductor 51 back to ground. Motor 27 is thereupon energized to rotate ring 22 and therefore ring 14 in such a direction that the arm 31 is again brought into engagement with the non-conducting segment 42, whereupon the motor 27 stops and the ring 14 rests in the plane of the gyroscope disc. When the relative movement between the ring 14 and the gyroscope disc is in the opposite direction, the arm 31 causes the pair of contacts 39 and also the pair of contacts 46 to be bridged, thus completing a circuit through the motor 27 in which the current flows in the opposite direction, thus causing the motor 27 to move the ring 14 in the other direction to restore coincidence of its plane with the plane of the gyroscope disc. The circuit for this condition may be traced from the source of current 45, through line 47, contacts 39, line 52, motor 27, line 53, contacts 46, line 51, back to the grounded side of the source of current.

The ring 14 and the disc of the gyroscope are always kept in that position with respect to each other in which the contacts of the arm 31 rest on the insulating segment 42. In the present instance the relationship is such that the ring 14 lies in the plane of the gyroscope disc under these conditions, but it is to be understood that any other relationship can be provided between these parts. The effective length of the insulating segments 42 can be made as small as desired to secure the desired degree of accuracy. By reason of the ring 14 following the movement of the gyroscope, relative movement between the trunnions 12 and 13 and their respective bearings is reduced to a minimum and friction at the trunnions 12 and 13, therefore, is practically entirely eliminated. In order to further minimize friction at the trunnions 12 and 13, the bearings at these points are mechanically made as frictionless as possible by using suitable ball or roller bearings. I have devised a novel type of frictionless bearing for this purpose which will be described presently.

Friction due to the rotation of the gyroscope about the axis of trunnions 17 and 18 is eliminated in a similar manner by providing follow-up mechanism for maintaining the ring 16 perpendicular to the gyroscope disc at all times. Since the ring 16 and the bearings 19 and 21 thereon follow the movements of the gyroscope relative movement between the trunnions 17 and 18 and their bearings 19 and 21, respectively, is maintained at a minimum, thereby practically entirely overcoming the effect of friction at these bearings. The follow-up mechanism for this purpose can be similar to that described in connection with the trunnions 12 and 13. Thus, I have shown a contact carrying arm mounted on the trunnion 17 to rotate therewith but capable of a limited amount of longitudinal movement relative thereto. The arm 56 carries contact wheels 57 and 58 at its extremity which are adapted to cooperate with contacts 59 and 61 carried by the ring 16. The position of contacts 57 and 58 relative to the sets of contacts 59 and 61 controls the circuit to a motor 62 so that the motor 62 remains at rest or is actuated in one direction or the other to rotate a gear 63 meshing with a pinion 64 on the shaft of the motor 62. Motor 62 can be mounted rigidly on the ring 22 and the gear 63 is fixed to the ring 16. For yieldably urging the contacts into firm engaging position a biasing spring 66 can be provided. The circuit connections of this follow-up mechanism can be similar to that described previously in detail and it is not believed necessary to again trace these circuits.

The horizontal trunnions 24 and 26 of ring 22 are journaled in bearings in ring 23. Ring 23 is kept in a plane which is perpendicular to the earth's north and south horizontal by a motor 71 energized by a circuit under the control of a horizon instrument. Ring 23 is journaled in vertical bearings 72 and 73 in a ring 74, the ring 74 being maintained in a vertical plane by a motor 76 also under the control of the horizon instrument. The ring 74 is supported for rotation about a horizontal axis in a ring 77. The ring 77 is supported for rotation in fore and aft horizontal bearings in a floating ring 78 carried by shock absorbing springs 79 in the binnacle 81.

The ring 77 is kept horizontal athwartship by providing means for leveling the same in this direction. The athwartship leveling apparatus comprises a motor 82 (Fig. 3) which is preferably energized by electrical impulses produced by a transmitter under the control of the horizon instrument. The motor 82 is mounted adjacent one of the trunnions 83 of the ring 77 and carries a pinion 84 which meshes with a gear 86. Ring 77 and gear 86 are both fixed to the trunnion 83 which is free to rotate in ring 78. Rotation of gear 86, therefore, will cause a corresponding rotation of ring 77. The motor 82 is mounted on a base 87 which is carried on an arm 88 mounted for pivotal movement about the pinion 83. A stabilizing member 89 is mounted on ring 78, and is provided with a curved outer edge 90 coinciding with a segment of a circle drawn about trunnion 83 as a center. The outer edge portion of member 90 slides in a groove at the bottom of the base 87 and serves to preclude fore and aft movements of motor 82 relative to the ring 78 and likewise relative to gear 86. The support afforded by the pivoted arm 88 and the stabilizing member 89, however, enables the ring 77 to assume an athwartship horizontal position in the suspending springs 79 without carrying with it the motor 82.

It is desirable to maintain the plane of the base 87 parallel with respect to the binnacle 81 or with respect to the ship's deck, so that the impulses transmitted by the horizon instrument will afford true leveling of the ring 77. For accomplishing this object and at the same time providing a construction which enables universal movement of the ring 78 with respect to the binnacle 81, I have shown a plate 91 pivoted at 92 to the base 87 of the motor and having its longitudinal edges slidably supported in a pair of guides 93. Each of the guides 93 has spaced alined pivotal connections, as at 94, to an upright support 96. Support 96 is in turn slidably carried in a guide 97 on binnacle 81, for movement along the edge of the binnacle. Thus, vertical movement of the ring 78 and the motor 82 relative to the binnacle 81 is permitted by the pivotal connections 92 and 94, athwartship movement is provided between the parts by the sliding support afforded by guides 93 and relative athwartship motion is enabled by the slidable connection between the upright members 96 and the binnacle 81. During any or all of these movements, however, the base 87 is maintained substantially parallel to the edge of the binnacle 81 by the upright members 96 and the guides 93 thereof, which cause the pivot 92 to remain parallel with the edge of the binnacle.

The wiring diagram for the motor 82 is shown in Fig. 7. Three sets of field windings a, b, and c can be provided and the armature d of the motor is adapted to align itself in the field of the energized windings. The motor is so designed that when two adjacent sets of field windings are energized the armature will take a position which is intermediate these windings. The transmitter comprises a plurality of sets of conducting segments A, B, and C, connected as shown, which are adapted to be engaged by a pair of contact arms E and F. The contact arms E and F are slightly out of alignment so that sometimes they engage segments of the same set and at other times they engage one segment of one set and one segment of another set. Both of the contact arms E and F continuously make electrical contact with a ring G which is connected to one side of a source of current. When the contact arms are in the position shown, that is, engaging two segments of the set A, a circuit is completed from the source of current through the ring G through the contact arms E and F and the segments A in parallel, through line l, through the field windings a and through line m back to the source of current. Under this condition, the armature d takes the position shown in the drawings. Now if the arms E and F are moved in a clockwise direction so that arm F still engages its segment A, but the arm E engages the segment C, tracing the circuits will show that the field windings a and the field windings c are both energized, thus causing the armature d to take a position which is intermediate the field windings a and the field windings c. As the contact arms E and F are rotated clockwise still further, arm F will leave segment A, while arm E still makes engagement with its segment C and current will flow only through the field windings c causing the armature d to align itself in the field of these windings. Rotation of the contact arms E and F in the opposite direction will effect opposite rotation of the armature d, in a like manner. Thus, the direction and the amount of rotation of the armature d is determined by and is proportional to the rotation of the contact arms E and F.

The conducting segments A, B, and C, are mounted to remain stationary relative to the ship, while the contact arms E and F are moved by the horizon instrument proportionally to the athwartship inclination of the horizon instrument relative to its support. Preferably, a gear train is interposed between the arms E and F and the horizon instrument to amplify the movement of the contact arms. Thus, the movement of the horizon instrument relative to its mounting in maintaining its athwartship level condition are transmitted to the ring 77, so that the ring 77 also remains level athwartship.

The ring 74 is supported for rotation about athwartship trunnions 101 and 102 carried by ring 77. Since the ring 77 is kept horizontal athwartship and since the axis of bearings 72 and 73 between rings 74 and 23 lies in a plane which is equidistant from the trunnions 101 and 102, the plane of trunnions 72 and 73 is kept vertical athwartship by the athwartship leveling of ring 77. It is desired to maintain the axis of bearings 72 and 73 vertical fore and aft, as well as vertical athwartship, and for accomplishing this object I have shown a motor 76 rigidly mounted on ring 74 which carries a pinion 103 meshing with a gear 104. The gear 104 is keyed or otherwise rigidly fixed to the trunnion 102 which in turn is fixed to the ring 77, while ring 74 is free on trunnion 102 and is mounted for rotation thereabout. The motor 76 can be similar to the motor 82 employed for athwartship leveling and a transmitting device similar to that shown in Fig. 7 can be employed for transmitting impulses to the motor 76. The transmitting apparatus in this instance is associated with the horizon instrument in such a manner that it transmits impulses derived from the fore and aft leveling movements of the horizon instrument. The leveling impulses transmitted to the motor 76 cause it to rotate in one direction or the other, thereby causing the pinion 103 to climb along the periphery of gear 104 in one direction or the other in accordance with the impulses transmitted. The relationship of the parts is such that this movement of the pinion 103 and motor 76 causes the ring 74 to be maintained continuously in a plane which is perpendicular to the fore and aft horizontal. The axis of bearings 72 and 73, therefore, is continuously kept vertical fore and aft and athwartship.

As heretofore mentioned, it is desired to maintain the ring 23 which is carried in bearings 72 and 73 in a plane which is vertical and at the same time perpendicular to the north and south horizontal. Since the axis of bearings 72 and 73 is vertical, the plane of the ring 23 is necessarily vertical by reason of the manner in which it is mounted. For maintaining the plane of the ring 23 perpendicular to the north and south horizontal I have shown a repeater motor 71 rigidly fixed to the ring 74. The motor 71 can be similar to the repeater motors 76 and 82 heretofore described. The motor 71 carries a pinion 106 which meshes with a gear 107, the gear 107 being rigidly fixed to the ring 23 and having its axis of rotation coincident with the axis of bearings 72 and 73. Transmitting apparatus similar to that shown in Fig. 7 can be employed for transmitting impulses to the motor 71. In this instance, however, the energizing impulses are derived from the movements of the indicator card of the gyrocompass. The relationship of the parts is such that the motor 71 rotates the ring 23 relative to the ring 74 in such a manner that the ring 23 assumes a plane which is perpendicular to the north and south horizontal, in response to the impulses transmitted by the transmitting apparatus associated with the indicator card. In other words, the plane of the ring 23 is maintained vertical and perpendicular to the plane of the true meridian. It may be recalled at this point that the spinning axis of a gyrocompass lies in the plane of the virtual meridian, as distinguished from the true meridian. Means is usually provided, however, for converting the virtual meridian indications into true meridian indications, so that the indicator card of the gyrocompass indicates the true meridian rather than the virtual meridian.

The ring 23 carries the ring 22 in east-west trunnions 24 and 26. The relationship of the rings 14 and 22 relative to the plane of the gyroscope disc has been described above.

Summarizing briefly the relationship of the various parts thus far described, the binnacle 81 is mounted in such a manner that it remains relatively stationary with respect to the ship and the ring 78 floats in the binnacle in suspension springs 79. The ring 77 is mounted for rotation about fore and aft trunnions in ring 78 and is kept horizontal athwartship. The ring 74 is mounted for rotation in ring 77 about horizontal athwartship trunnions and is kept in a vertical plane. The ring 23 is carried by ring 74 in vertical trunnions and is kept in the plane which is perpendicular to the north and south horizontal. Expressed in another way the plane of the ring 23 is vertical and perpendicular to the plane of the meridian. The ring 22 is mounted for rotation within ring 23 about east and west horizontal trunnions. The ring 22 follows the movements of the gyroscope in azimuth. The ring 14 follows all movements of the gyroscope disc and remains in the plane of the gyroscope disc. The ring 16 likewise follows all movements of the gyroscope but the plane of the ring 16 remains perpendicular to the plane of the gyroscope disc.

From the description thus far, it will be noticed that when the ship is stationary or when it is speeding due east or due west, the spinning axis of the gyroscope remaining, therefore, in the plane of the true meridian, the ring 14 will lie in the plane of the ring 22, since the planes of both of these rings are perpendicular to the plane of the true meridian and have one line in common, that is, the axis of trunnions 17 and 18. Ring 22, however, follows the plane of the true meridian at all times and remains perpendicular thereto, while ring 14 is caused to be brought perpendicular to the plane of the virtual meridian. If, therefore, the ship's course has a northerly or southerly component, thereby producing a virtual meridian which is not coincident with the true meridian, the plane of ring 14 and the plane of ring 22 will not be in coincidence. Means will be described presently for automatically compensating for any error which might otherwise be introduced on account of this condition, but before entering into the details of that feature, means will be described for preventing undue oscillation of the gyroscope in moving to the virtual meridian.

The position of the virtual meridian is determined by the ship's course and speed and by the rate at which the gyroscope is carried from west to east on account of the earth's rotation. At the Equator, the velocity of a point on the earth's surface due to the earth's rotation is at the maximum value and the velocity decreases as the poles are approached. In other words, while the angular velocity of the earth remains constant, the linear velocity varies from a maximum at the Equator to a minimum at the poles. Thus, the factors which enter into the determination of the virtual meridian are the ship's course or direction, the ship's speed, and the latitude. At the Equator the earth's surface has a velocity from west to east in the neighborhood of one thousand miles per hour and the ship's speed when compounded with this high velocity will have but little effect and the virtual meridian will be practically coincident with the true meridian. As the ship moves to a higher latitude, however, the difference between the virtual meridian and the true meridian becomes more pronounced. Under ordinary conditions it is unlikely that the difference between the true meridian and the virtual meridian will be more than 12°, and I have taken this value arbitrarily for purposes of the present description, as being the maximum deviation which will be encountered. However, the principles of the invention can be applied to other values of maximum of deviation, either greater or less than 12°.

When the ship is steaming north, the direction of the virtual meridian is to the west of north, while if the ship is steaming south, the direction of the virtual meridian is to the east of north. When the ship is steaming due east or due west or if it is stationary, the virtual meridian is coincident with the true meridian and, therefore, lies in the north and south plane. Thus, for north steaming the permissible oscillation of the gyroscope will lie between 12° west of north and zero degrees east of north, and for south steaming the permissible oscillation will lie between 12° east of north and zero degrees west of north. For east or west steaming, a negligible amount of oscillation only is tolerated.

The oscillations of the gyroscope axle are circular and east and west oscillations, therefore, are accompanied by corresponding oscillations in elevation. Undue oscillations in elevation, if pronounced, will tend to introduce an error in the latitude indications of the instrument. In order to preclude undue oscillations while at the same time permitting permissible oscillations, I have provided means for automatically fixing the range within which the gyroscope may oscillate, said means being responsive to the direction in which the ship is steaming. When the gyroscope oscillates in elevation outside of the range fixed, a horizontal force is directed against the gyroscope axle to cause the gyroscope to precess in elevation in a direction which brings the gyroscope axle back into the range of permissible oscillations. For accomplishing this object, I provide a pair of magnets, one of which when energized exerts a force on the gyroscope which causes it to precess to diminish the elevation of its axle and the other of which when energized, causes the gyroscope axle to precess to increase its elevation.

Thus, in Figs. 1 and 3 I have shown a pair of damping magnets 121 and 122 mounted in any suitable manner on ring 16. Each of the magnets 121 and 122 is provided with a plunger 123 and 124 respectively, having a rod 126 extending therefrom which is guided for sliding movement within a guide member 127. A cross arm 128 is keyed or otherwise fixed to trunnion 18 and each of the magnets 121 and 122 exerts a force on one end or the other of the cross arm 128 tending to turn the trunnion 18 and therefore the ring 14 and the gyroscope. When this turning torque is in one direction, the gyroscope axle precesses upwardly and when it is in the other direction, it precesses downwardly.

The arm 128 can be forked at each end to provide yokes 129 and 131 which embrace the plunger rods 126 and suitable collars or the like can be mounted on the rods 126 adjacent the yoke, so that the movement of the rods 126 is transmitted to the cross arm 128. Only one of the magnets 121 or 122 is energized at one time and the direction in which the gyroscope axle is caused to precess is determined by the particular magnet which is energized. The magnets are designed to have sufficient strength to cause the gyroscope to precess back into the permissible range of oscillation to the desired extent and they should not, of course, be so powerful as to be disturbing. As is well understood in the art, the direction of precession of the gyroscope axle will also be determined by the direction in which the gyroscope wheel is rotating, but since the gyroscope wheel is adapted to rotate in the same direction at all times, this factor will not vary and it need only be considered in the initial set-up of the apparatus.

For establishing the range of permissible oscillations of the gyroscope axle, I provide a set of adjustable contacts 132 to 135, shown in detail in Fig. 8, adapted to be selectively moved into alignment with a pair of relatively stationary contacts 136 and 137. The adjustable contacts 132 to 135 are carried by a slidable member 138 of insulating material adapted to slide along suitable tracks 141 and 142. The member 138 can be connected to the plunger 143 of a multiple winding electromagnet 145 having field windings 146, 147 and 148. The windings 146, 147 and 148 are adapted to be selectively energized in response to the direction in which the ship is steaming, the winding 147, for example, being energized when the ship's head is pointed due east or due west, the winding 146 being energized when the ship's course has a northerly component and the winding 148 being energized when the ship's course has a southerly component. Each of the windings is adapted to be energized momentarily by a relatively short electrical impulse and a spring pressed detent 149 or its equivalent is employed for maintaining the plunger 143 of the electromagnet in its actuated position. When the plunger 143 of the electromagnet is in the position shown in Fig. 8, the contacts 133 and 134 are effective in determining the range of permissible oscillations and a contact wheel 151 rolling along a line interconnecting the contacts 136 and 137 will be permitted to move only in the space between contacts 133 and 134, without effecting the energization of either the magnet 121 or the magnet 122. When the winding 148 is energized, the plunger 143 is drawn downwardly and brings the contact 132 in line with the contacts 136 and 137. The contact wheel 151 is then permitted to move between the end of contact 132 and the end of contact 137 before either one of the damping magnets 121 or 122 will be energized. In a like manner when the winding 146 is energized, the contact wheel 151 will be permitted to move between the contact 135 and the contact 136 before effecting the energization of the damping magnet. These distances determine the range of permissible oscillations of the gyroscope. Further movement of the wheel 151 will effect the closing of a circuit to either the magnet 121 or the magnet 122 to dampen the oscillation and cause the gyroscope wheel to precess back into the range which has been established for it.

As shown in Fig. 1 and in more detail in Fig. 12, the contact wheel 151 can be mounted on one side of the gear 63 which is fixed to the ring 16 and the electromagnets and the adjustable contacts controlled thereby are mounted on the ring 22. Since ring 16 follows the movement of the gyroscope into the virtual meridian and since the plane of the ring 22 is determined by the true meridian, the movement of contact wheel 151 relative to the adjustable range limiting contacts will be in accordance with the relative position of the virtual meridian and the true meridian, provided there is no undue oscillation of the gyroscope. If the ship is steaming north, for example, the angle between the virtual meridian and the true meridian may be any value, up to say 12°, and the virtual meridian lying west of north. If the gyroscope tends to oscillate more than 12° west of north, however, one of the damping magnets 121 or 122 is energized to bring the gyroscope axle back into the 12° limit. On the other hand, if the gyroscope axle tends to swing to the east of north by any amount, one of the magnets 121 or 122 will be energized to bring the axle back into a position which is west of north. For the south steaming setting, the gyroscope axle will be permitted to oscillate to any point between 12° east of north and zero degrees west of north, but not outside of this range, and for east or west steaming only a negligible amount of oscillation about the true meridian is permitted.

For selectively energizing the windings 146, 147 and 148 in accordance with the direction in which the ship is steaming, a contact wheel 153 carried by an arm 152 (Fig. 10) can be provided. The arm 152 can be mounted in any suitable manner to remain stationary with respect to ring 74 and in the embodiment illustrated I have shown the arm 152 as pointing in the direction of the ship's head. For example, the ring 74 can be made fast on a trunnion 154 and the arm 152 keyed to the trunnion, while ring 23 is mounted loose on the trunnion 154. The contact wheel 153 bears against the surface of an insulating disc 156 rigidly mounted on ring 23. It will be recalled that the ring 74 is mounted in athwartship trunnions and is kept vertical, while the ring 23 is kept vertical and in a plane which is perpendicular to the north and south plane. Thus, as the ship changes its course, there will be relative movement between the contact wheel 153 and the disc 156, the position of the contact wheel 153 relative to the disc 156 indicating the direction of the ship's motion. A contact button 157 carried by the ring 156 is adapted to be engaged by the contact wheel 153 when the ship is steaming due east, and an oppositely disposed button 158 on disc 156 becomes engaged by the wheel 153 when the ship is headed due west. On either side of button 157, buttons 159 and 160 are provided which are engaged by the contact wheel 153 when the ship's course changes to the north or to the south, respectively. In a similar manner, contact buttons 161 and 162 are mounted on either side of button 158 to indicate when the ship's course changes from due west to the north or to the south. Each of the contact buttons can be made of conducting material and a spring 163 is provided for biasing the buttons in each case against a contact terminal 164 connected to a wire 166 which leads to the electromagnets 146, 147 or 148. When the contact wheel 153 is moved adjacent the contact button 157, for example, the wheel is in electrical connection with the wire 166. An instant later, however, the wheel 153 depresses the button 157 and the electrical connection is broken at the terminal member 164 and the button 157, thereby opening the circuit between wheel 153 and wire 166. In this manner, an abrupt electrical impulse is caused to flow in the circuits controlled by the contact wheel 153 and the respective buttons on disc 156.

A circuit diagram showing the electrical connections for controlling the damping magnets 121 and 122 is illustrated in Fig. 6. Assuming the ship is steaming due east, the contact wheel 153 engages the button 157 and transmits an impulse through the winding 147 of the electromagnet 145 to move the contacts 133 and 134 in alignment with the contacts 136 and 137. The permissible range of oscillations of the gyroscope, therefore, is determined by the distance between the contacts 133 and 134. The adjustable contacts 132 to 135, shown at the right hand side of Fig. 6 control the energization of the damping magnet 122 and a duplicate set of adjustable contacts 132' to 135' cooperating with a contact wheel 151' control the energization of the damping magnet 121. The contact wheels 151 and 151' can both be mounted on the gear 63, as shown in Fig. 12, and are therefore adapted to have corresponding movements. The circuits over which the winding 147 is energized can be traced from the grounded battery 45 through contact wheel 153, contact button 157, conductor 168, conductor 169, winding 147, conductor 171, conductor 172 to ground and back to the battery 45. Conductors 173 and 174 connect the winding 147' in parallel with the winding 147 so that at the same time that winding 147 is energized the winding 147' is also energized to move the contacts 133' and 134' into alignment with the contacts 136' and 137'.

So long as the gyroscope does not oscillate outside of its permissible range, as fixed by the contacts 133 and 134 and the contacts 133' and 134', the contact wheels 151 and 151' will remain at the insulating portion between their respective contacts and neither of the magnets 121 and 122 will be energized. If, on the other hand, the gyroscope oscillates too far to the east, the contact wheel 151 will engage the contact 134 and the contact wheel 151' will engage the contact wheel 134'. The east and west oscillations of the gyroscope are accompanied by oscillations in elevation and the magnets 121 and 122 are energized selectively in accordance with the oscillations in elevation, the magnet 122 being energized, for example, when the gyroscope axle swings upwardly to cause the same to precess downwardly and the magnet 121 being energized when it swings downwardly to cause it to precess upwardly. When the gyroscope oscillates beyond its range to the east, it may be swinging either downwardly or upwardly at the same time. If it is swinging upwardly, certain ones of the contacts associated with the follow-up apparatus between range 14 and the gyroscope will be engaged by the contact arm 31 and if it is swinging downwardly the opposite contacts will be engaged by the arm 31. I makes use of this condition to select the proper damping magnet 121 or 122 to counteract the swing. Thus, the contacts 41 are connected in series with the contact wheel 151 so that magnet 122 can be energized only when the contacts 41 are bridged. In a like manner, the opposite contacts 39 are connected in series with the contact wheel 151' so that the magnet 121 can be energized only when the contacts 39 are bridged. Now, if the oscillation to the east is accompanied by an upward swing of the gyroscope axle, the magnet 122 is energized to cause it to precess downwardly, over a circuit which extends from grounded battery 45, conductor 47, contacts 41, contact wheel 151, contact 134, conductor 176, contact 137, conductor 177, through magnet 122 to ground. In response to the force exerted by magnet 122, the gyroscope axle, is caused to precess downwardly back into the permissible range of oscillation.

If the oscillation to the east is accompanied by a downward swing of the gyroscope axle, however, and all other conditions remain the same, the magnet 121 will be energized to cause the gyroscope axle to precess upwardly over a circuit which extends from grounded battery 45, conductor 47, contact 39, conductor 52, conductor 178, contact wheel 151', contact 134', conductor 179, contact 137', conductor 181, contact 136', conductor 182, through magnet 121 and line 172 back to ground.

If the gyroscope oscillates outside of the range of permissible oscillation to the west, contact wheel 151 will engage contact 133 and contact wheel 151' will engage contact 133'. If this westward oscillation is accompanied by an upward swing of the north end, magnet 122 will be energized, as before, to cause a downward precession over the circuit which extends through the contacts 41, contact 133 and the magnet 122. If the westward oscillation is accompanied by a downward swing of the gyroscope axle, magnet 121 will be energized to cause the axle to precess upwardly back into the range of permissible oscillation.

Assuming now that the course of the ship changes to the north or to the south, say south for example, the contact wheel 153 will engage the button 160 thereby energizing momentarily both of the magnets 148 and 148' to bring the range limiting contacts 132 and 132' into alignment with their respective cooperating wheels 151 and 151'. The distance between the contacts 132 and 137 now determines the range of permissible oscillation. For south steaming this range has been arbitrarily chosen to lie between 12° east of north and approximately zero degrees west of north. So long as the contact wheels 151 and 151' remain within the permissible range, no energization of the magnets 121 or 122 will be effected, irrespective of the open or closed condition of the contacts 39 and 41. If the gyroscope axle swings more than 12° to the east, however, contact wheel 151 will engage contact 137 and contact wheel 151' will engage contact 137'. When this eastward oscillation is accompanied by an upward swing of the gyroscope axle so that contacts 41 are bridged, magnet 122 will be energized to cause precession of the axle downwardly, but when it is accompanied by a downward swing, magnet 121 will be energized. No oscillation beyond zero degrees west of north is permitted on south steaming, the contacts 132 and 132' serving to limit the swing to the west when the gyroscope tries to oscillate to the west beyond the meridian. When contacts 132 and 132' are engaged by the contact wheels 151 and 151', the magnets 121 and 122 are selectively energized, as before, to cause precession in the proper direction to bring the gyroscope oscillations back into the permissible range.

In a like manner, when the ship's head points north or has a northerly component either the button 159 or 161 is engaged to energize the windings 146 and 146', thereby adjusting the range limiting contacts so that oscillation is confined between 12° west of north and zero degrees east of north, the magnets 121 and 122 coming into play, as before, when the oscillation exceeds these limits.

Thus, the contact wheel 153 and its associated contact buttons 157 to 162 serve to automatically adjust the setting of the range limiting contacts 132 to 137 and 132' to 137', in accordance in the direction in which the ship is steaming. The contact wheels 151 and 151' cooperating with the range limiting contacts serve to establish the range of permissible oscillations and the contacts 39 and 41 serve to selectively energize the magnets 121 and 122 to cause the gyroscope axle to precess back into the range which has been established.

The axis of the gyroscope, therefore, is permitted to swing into the plane of the virtual meridian and to take a position parallel with the virtual axis of rotation, as distinguished from the polar axis of the earth, but the gyroscope axle is not permitted to oscillate beyond 12° west of north for north steaming nor beyond 12° east of north for south steaming, these values being fixed by the maximum deviation of the virtual meridian from the true meridian under conditions ordinarily encountered. Under special conditions of travel, such as travel within a few degrees of either pole of the earth or at tremendously high velocities north or south, the possible deviation of the virtual meridian from the true meridian may lie outside of these ranges, and in that event the ranges can be extended accordingly. It will be recalled that the ring 23 is kept in a plane which is vertical at all times and which is perpendicular to the plane of the true medirian. The ring 22 remains perpendicular to the plane of the meridian, but follows the gyroscope axle in elevation. The angle between the rings 22 and 23, therefore, indicates the latitude exactly when the axis of the gyroscope lies in the plane of the true meridian. When the axis of the gyroscope lies in the plane of a virtual meridian, the angular displacement between rings 22 and 23 is only approximately equal to the angle of latitude, the difference, however, being a function of the amount of deviation of the virtual meridian from the true meridian and therefore readily determinable.

For indicating the angle of latitude, a graduated circle or semi-circle 201 (Fig. 17) is rigidly mounted on ring 23, an auxiliary arm 202 being provided which extends at right angles to ring 23 to assist in supporting the circle 201. The circle 201 is graduated through 180°, the graduations extending through 90° on each side of a center or zero line, those on one side indicating north latitude and those on the other indicating south latitude. Cooperating with the graduations on circle 201 is a pointer arm 203 rigidly mounted on the trunnion 26 which passes freely through ring 22 and ring 23. Secured to the other end of trunnion 26 is an arm 204, (see Figs. 13 and 15) the extremity of arm 204 being supported in a bracket 206 carried by a ring 207 which is mounted rigidly on ring 22 and extends at right angles thereto. Rings 22 and 207 move together at all times and their movement relative to ring 23 is transmitted to the pointer arm 203 through the bracket 206 and the arm 204. Therefore, the angular displacement between rings 22 and 23 is indicated by the pointer arm 203 as it moves along the graduations of circle 201. If desired, a vernier scale 208 can be provided on the end of arm 203 to enable more accurate readings.

When the axis of the gyroscope swings into parallelism with the virtual meridian, the ring 16 follows this movement. The ring 22 and the ring 207 mounted thereon, however, do not follow the movement of the gyroscope axle into the plane of the virtual meridian, but maintain their relationship with the plane of the true meridian. The amount of displacement between rings 16 and ring 207 therefore, is determined by the angle between the true meridian and the virtual meridian.

Rigidly secured to the ring 207 are a pair of brackets 209 and 211 (Figs. 13 to 15) carrying bearings in which a rotatable spindle 212 is journaled. The axis of rotation of spindle 212 is substantially parallel with the arm 204, and bridging the space between spindle 212 and arm 204 is a needle 213 having relatively pointed ends, one of which bears against the peripheral surface of spindle 212 and the other of which bears against the side of arm 204. A biasing spring 214 carried by the bracket 206 resiliently urges the arm 204 toward the spindle 212, thereby exerting a relatively constant pressure on the needle 213.

The surface of the spindle 212 is generated in accordance with the corrections it is desired to make in the latitude indications to compensate for the error which would be otherwise introduced on account of the axle of the gyroscope following the virtual meridian rather than the true meridian. The needle 213 is moved longitudinally along the surface of the spindle in accordance with the latitude, that is, it bears against the lower end of spindle 212 at the Equator and moves toward the upper end of the spindle 212 as one or the other of the poles of the earth is approached. The spindle 212 is also adapted to be turned about its axis for a partial revolution in one direction or the other in accordance with the amount and the direction of the deviation of the virtual meridian from the true meridian. It will be noticed that the surface on arm 204 against which the needle 213 bears is in alignment with the center of the trunnion 26, so that as the needle 213 moves from the lower end of spindle 212 toward the top, no relative movement of the arm 204 is effected, so long as the line traced on the surface of spindle 212 by the needle 213 is uniformly spaced from the axis of the spindle. For example, when no correction is to be made in the reading, the needle 213 bears on a point on the surface 212 such that no displacement of the arm 204 is effected by the correction mechanism. When a positive correction is desired, the needle 213 bears on a "high" point on the surface 212 and when a negative correction is desired, the needle bears on a "low" point on the surface 212, thereby causing the arm 204 to be moved by an amount equal to the angular correction. This movement of the arm 204 is transmitted to the pointer arm 203 in such a manner that the arm 203 indicates at all times the corrected readings.

The correction which is to be applied is a function of the latitude and is also a function for deviation between the virtual meridian and the true meridian. Thus, the particular point on surface 212 against which the needle bears should be determined by the latitude and by the amount of deviation between the virtual meridian and the true meridian. For accomplishing this object, the spindle 212 is rotated about its axis in accordance with the amount of deviation and the needle 213 is moved longitudinally of the spindle in accordance with the latitude.

For rotating the spindle 212 in accordance with the amount of deviation between the virtual and the true meridian, I make use of the relative movement between the ring 16 and the ring 207, which movement is proportional to the amount of deviation. As representative of suitable means for translating the movement between rings 16 and 207 into rotational movement of spindle 212, I have shown a segmental bevel gear 216 secured to the lower end of the shaft which carries the spindle 212. A bevel gear 217 rigidly secured to a shaft 218 meshes with gear 216 and shaft 218 is journaled in bearings 219 and 221 carried by the ring 207. Thrust collars 222 and 223 preclude longitudinal movement of the shaft 218 in its bearing. A guide rod 224 is mounted in parallel spaced relationship with the shaft 218 and a slidable cross head 226 is supported for longitudinal sliding movement along the shaft 218 and the rod 224. A worm 227 is formed on the shaft 218 and a stud 228 carried by the cross-head 226 can be provided for engaging the worm. As the cross-head 226 is moved longitudinally along the shaft 218, the bevel gear 217 is turned in one direction or the other as determined by the direction of movement of the cross-head 226 and the amount of rotation of the gear 217 is proportional to the distance through which the cross-head is moved. Thus, the spindle 212 is turned in proportion to the movement of the cross-head 226 along the shaft 218.

The cross-head 226 is provided with a depression 231 which is adapted to receive a feather 232 carried by ring 16. As the ring 16 takes its position into the plane of the virtual meridian, the cross-head 226 follows and effects a corresponding turning movement of spindle 212. Preferably, the relationship between the parts is such that when the ring 16 swings past the limit in either direction, the feather 232 clears the depression 231 and leaves the cross-head 226. Spring catches 233 can be provided for holding the cross-head until it is picked up on the return swing of the ring 16. It will be recalled that a limit of 12° of movement in either direction will ordinarily suffice, but it is a simple matter to change the proportion of the parts to provide for any other limiting values. In the present description it is assumed that an oscillation past 12° in either direction occurs only when the gyroscope axle is oscillating past the value it will eventually assume in response to the earth's directive force. Naturally, when conditions are such that the directive force may tend to hold the gyroscope axle more than 12° from the true meridian, the limits should be extended accordingly.

The effect of the correction spindle 212, as thus far described, is to correct the reading in accordance with the deviation of the virtual meridian from the true meridian. For example, if the deviation is 3° to the west of north, relative movement between the ring 16 and ring 207 will cause the spindle 212 to be turned to present a point on the surface which corrects the reading for this amount of deviation. If the deviation is 3° to the east of north, a point on the surface of spindle 212 is presented which corrects for that deviation, and so on, the spindle 212 being turned in the proper direction and by the proper amount to automatically correct the readings for deviations up to 12° in either direction. If the amount of correction were the same for different latitudes, it would be unnecessary to provide for any other relative movement between the spindle 212 and the needle 213. However, the correction to be applied for a particular amount of deviation is different for different latitudes. Therefore, in addition to the relative movement between spindle 212 and needle 213 controlled by the amount of deviation, I provide means for effecting relative movement between these members in accordance with the latitude. Thus, I have shown the needle 213 mounted on a suitable carriage 236 adapted to slide along guiding slot 237 formed in ring 207. The slot 237 runs parallel with the axis of spindle 212 and as the needle carriage 236 is moved therein, the needle moves longitudinally along the surface of spindle 212.

For moving the needle carriage 236 in the slot 237 substantially in accordance with the latitude, I have shown a link mechanism comprising a link 238 pivoted at one end to the carriage 236 and pivoted at its other end, as at 239, to a cross-head 241 adapted to slide in a slot 242 in arm 202. This relative rotation is the measure of the latitude and accordingly the longitudinal position of needle 213 on surface 212 is determined by the latitude. The relationship of the parts is such that at the Equator the links 238 and 243 are in dead center position and the needle 213 is at the lower end of spindle 212. The pivot point 239 is swung from this position as north latitude values are indicated until at the North Pole, or 90° north latitude, the needle reaches the limit of its upward movement along the surface of the spindle. For latitudes south of the Equator, the action is symmetrical, so that the needle 213 will move upwardly in a similar manner as the South Pole is approached. In other words, the needle 213 will be near the top of the spindle 212 at the North Pole and will gradually move downwardly as the ship moves to a lower latitude until at the Equator the needle will be at the bottom of the spindle. After passing the Equator and moving still further south, the needle will start upwardly and at the South Pole it will again be at its extreme upper position.

For any particular angle of latitude, therefore, the needle is at a corresponding level and the corrections to be applied for different values of deviation between the virtual meridian and the true meridian at that latitude can be laid off on the spindle 212 at that level. Thus, the proper correction can be provided for every value of deviation, within the limits set, for every latitude. Roughly speaking, the spindle will have a longitudinal center line or zero line in its surface which is parallel to the axis of the spindle and the needle will rest on this line when no correction is to be made, that is, when the virtual meridian coincides with the true meridian. On one side of this line, the surface of the spindle will be "high" to correct the readings when the virtual meridian lies on one side of the true meridian, each point on the surface being sufficiently high to correct the reading for the latitude and the amount of deviation represented by each of the innumerable points on the surface. On the other side of the zero line the surface will be "low" to provide corrections for deviations of the virtual meridian when it lies on the other side of the true meridian. In the embodiment illustrated, when the needle bears against a high spot on the spindle, the pointer arm 203 is moved in a clockwise direction relative to the graduated circle 201 by an amount equal to the desired correction, the correction usually being not greater than a fraction of one degree. Likewise, when the needle 213 rests on a low spot on the surface of the spindle 212, a correction in the opposite direction is automatically applied to the pointer arm 203. Thus, the corrections are applied automatically and the position to which the pointer arm is moved indicates the true latitude at all times.

Figure 21:
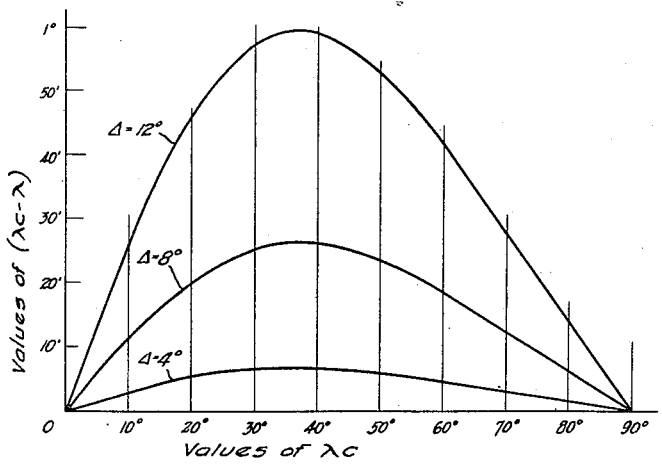
Fig. 21 is a graph showing corrections to be applied to compensate for the north steaming error in the latitude instrument.

In Fig. 21 I have shown the curves obtained by plotting the calculated values of the corrections to be applied against the latitude for different values of Δ, the angle between the virtual meridian and the true meridian. Curves are shown for the values 4°, 8° and 12° for Δ. The abscissæ of the curves represent the angular displacement between rings 22 and 23, or the value of the latitude which would be indicated if no correction were applied. Of the characters employed in the graph, λ represents the true angle of latitude, λc represents the angular displacement between rings 22 and 23 or the true angle of latitude plus or minus the error c, and (λc—λ) represents the correction to be applied.

Preferably, repeater apparatus is provided for transmitting the indications to different points on the ship, for the convenience of the pilot or the captain for example, or for controlling automatic recording devices or automatic steering devices. Such repeater apparatus can be similar to the type commonly used for repeating the readings of the master compass. For transmitting impulses to the repeaters a gear segment 251 can be secured to the pointer arm 203 which meshes with a pinion 252 secured to the shaft of a gear 253. Gear 253 drives a pinion 254 secured to a shaft which carries a pair of contact arms 256 and 257 which are adapted to engage a plurality of conducting segments 258. The transmitter can be connected in an electrical circuit similar to the one shown in Fig. 7 for driving one or more repeater motors of the type shown in Fig. 7. The repeater motors can be employed to duplicate the readings indicated by the master instrument or to perform any other desired function in response to the latitude indications. In Figs. 18 and 19, for example, I have shown a motor 250 which is adapted to move a dial 255 in accordance with the transmitted impulses, whereby the latitude indicated by the gyroscope is indicated also by the dial 255.

Summarizing the operation of the latitude indicating instrument, it will be recalled that the gyroscope is set in motion with the plane of its spinning disc parallel with the plane of the Equator. Its spin axis remains parallel with the polar axis of the earth for movements of the ship in a direction which is due east or due west. When the ship's course has a northerly or southerly component, the spin axis moves into the plane of the virtual meridian. Follow up mechanism associated with the rings 14 and 16 causes these rings to follow all movements of the gyroscope axle as it changes its direction relative to the mounting rings. Ring 22 is caused to follow the movements of the gyroscope axle in elevation and to remain perpendicular to the plane of the true meridian at all times. Ring 23 is caused to remain vertical at all times and perpendicular to the plane of the true meridian. The latitude indications are obtained from the angular displacement between the ring 22 and the ring 23, corrections being automatically made by the correction spindle 212, so that the true latitude is indicated, irrespective of whether the axle of the gyroscope lies in a plane of the true meridian or in the plane of the virtual meridian.

It will be noticed that all external forces tending to impair the accuracy of the instrument have been either eliminated, compensated for, or counteracted in the design of the instrument. The effect of friction, for example, has been reduced to a minimum by causing certain ones of the rings to follow the gyroscope, these rings being driven by follow-up motors so that there is relatively little movement between the principal trunnions of the gyroscope and their respective bearings. The effect of the earth's rotation about its axis is employed in the operation of the instrument to direct the axle of the gyroscope and thus, it becomes a beneficial factor rather than a harmful one. The effect of the ship's travel over the surface of the earth is compensated for by the correction spindle 212.

The remaining external forces which ordinarily influence gyroscopic devices, arise mainly from the unbalance of the parts and the effect of such forces can be minimized by balancing the parts about every axis by providing compensating weights. Centrifugal forces and ballistic forces arising from the rolling and pitching of the ship and from abrupt changes in its course or speed, will have little or no effect if the instrument is statically and dynamically balanced about all axes. The instrument readily lends itself to such balancing because all axes pass through a point in common which can be made the center of gravity of the entire instrument as well as the center of gravity of each of the rings and its appendages.

One other external force, that is, the force arising from the earth's travel in its orbit about the sun, may in a period of years have an effect on the gyroscope axle, but the effect of this force is so very slight that it would be a useless refinement to attempt to counteract it. Furthermore, there is no necessity for providing for continued operation of the device over such a long period of years that the earth's motion in its orbit will be felt. Ordinarily, it is contemplated that the instrument will be reset and started anew from time to time when the ship enters ports of known geographic position, as conditions may warrant.

Figure 20:
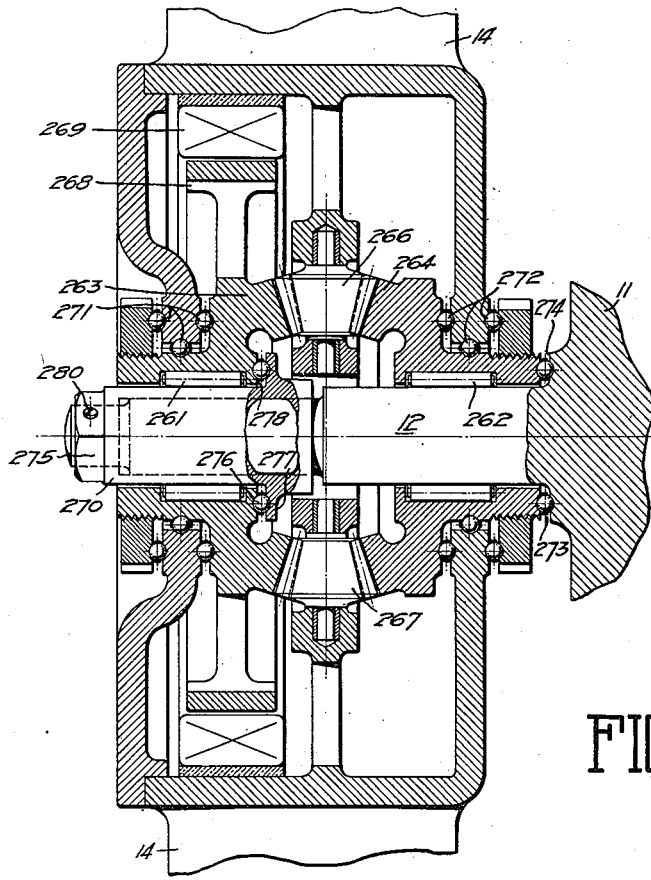
Fig. 20 is a detail view of a frictionless bearing in which the effect of frictional forces is neutralized.

For still further minimizing the effect of friction, I have devised a bearing in which static friction is entirely eliminated and in which two equal and opposite frictional forces are set up by the dynamic or kinetic friction between the bearing surfaces. This bearing can be employed at any of those trunnions in which the effect of frictional forces is apt to be communicated to the gyroscope, such as the trunnions 12 and 13 between the gyroscope housing and the ring 14 and the trunnions 17 and 18 between ring 14 and ring 16. In Fig. 20 I have illustrated in detail one manner in which my antifriction bearing could be applied to the trunnion 12, for example.

Two main roller bearings 261 and 262 are provided for rotatably supporting the trunnion 12. Each of the bearings 261 and 262 is adapted to be constantly rotated, one in a clockwise direction and the other in a counter-clockwise direction, preferably at a slow rate but one which, nevertheless, exceeds any rate at which the trunnion 12 is likely to rotate in either direction during operation. For rotating the bearings 261 and 262 in opposite directions but at the same rate, I have shown the bearing 261 mounted on a bevel gear 263 and the bearing 262 mounted on a bevel gear 264. Intermeshing with the gears 263 and 264 are a pair of pinions 266 and 267. A motor armature 268 is fixed to gear 263 and a field winding 269 carried by the ring 14 completes a motor structure which, when energized, causes the gear 263 to rotate about the trunnion 12 in one direction, say clockwise when looking toward the end of trunnion 12, and through the intermedium of pinions 266 and 267 the gear 264 is caused to rotate at the same rate in a counter-clockwise direction, thus maintaining the bearings 261 and 262 in constant rotation about the trunnion 12, irrespective of the state of rest or of motion of the trunnion 12. Static friction between the bearings 261 and 262, therefore, is entirely eliminated. A dynamic frictional force will be set up by bearing 261, but this force is opposed by an equal and opposite dynamic frictional force set up by bearing 262. The resultant dynamic frictional force on trunnion 12, therefore, is reduced to substantially zero when the trunnion 12 is stationary relative to the ring 14.

Suitable antifriction bearings 271 can be interposed between the gear 263 and the ring 14 to reduce the load on the motor, but the friction in these bearings will not be communicated to the trunnion 12. In a like manner similar bearings 272 can be provided between gear 264 and the ring 14.

A thrust bearing 273 can be provided between a flange 274 at the inner end of trunnion 12 and the adjacent end of the constantly moving gear member 264. The dynamic frictional force set up by the bearing 273 can be neutralized by providing a second thrust bearing 276 which is similar in every respect with the bearing 273. The thrust bearing 276 can be interposed between a flange 277, secured in any suitable manner to the trunnion 12, and the adjacent surface 278 of the gear member 263. Preferably, the flanges 274 and 277 are so disposed on the trunnion 12 that the thrust is equally divided between the bearings 273 and 276, and if desired, the position of one of the flanges can be made adjustable in any suitable manner to attain this relationship. As representative of suitable means for providing relative adjustability between the flanges 274 and 277, I have shown the flange 277 formed on a sleeve 270 which snugly embraces a reduced portion on the trunnion 12. The extreme end 275 of the trunnion 12 can have a screw thread formed thereon which engages a corresponding tapped thread at the outer end of sleeve 270. By this expedient, sleeve 270 can be adjusted longitudinally of the trunnion 12 until the thrust borne by flange 277 is equal to the thrust borne by flange 274. A set screw 280 or the like can be employed for locking the sleeve 270 in its adjusted position.

Since the thrust bearings 273 and 276 are constantly rotated in opposite directions and at the same rate, static frictional forces are entirely eliminated in these bearings, also, and the dynamic frictional forces will be mutually neutralized for any inclination of the trunnion 12. For example, when the trunnion 12 is moved so that it is vertical and at the lower end of the gyroscope housing 11, one-half of the weight of the gyroscope will be carried by thrust bearing 274 and the other half of the weight will be carried by bearing 276. The pressure on the bearings being the same, the frictional forces will also be the same, but in opposite directions and therefore in neutralization. For intermediate inclinations of the trunnion 12, the component of the gravitational force acting on the gyroscope housing will be equally divided between the bearings 273 and 276.

When an antifriction bearing of this type is employed at the trunnion 12, the trunnion 13 is preferably supported in an identical antifriction bearing, the relationship between the two bearings being such that the rotating roller bearings 261 and 262 alternate in direction of rotation from one end of the main axis of rotation to the other. In other words, if the outer bearing 261 at trunnion 12 is rotating in a counter-clockwise direction, the inner bearing 262 will rotate in a clockwise direction, the inner bearing on trunnion 13 will rotate in a counter-clockwise direction and the outer bearing at trunnion 13 will rotate in a clockwise direction. By virtue of this relationship between the bearings, the dynamic frictional forces will be in equilibrium and the housing 11 can rotate in one direction just as readily as in the other direction relative to the ring 14. Since the ring 14 is adapted to follow the slightest movement of the housing 11, any frictional force set up by the turning of housing 11 is immediately opposed by the frictional force set up by the ring 14 as it turns to follow the movements of the housing. Thus, in any event, the frictional forces arising at the trunnion 12 are automatically compensated for when they are not neutralized.

Any available source of current can be employed for energizing the motors of the respective bearings formed by the field winding 269 and the armature 268, the motors being designed to operate in the desired manner on current which is available. Regulated impulses from a storage battery, which are also employed to drive an hour angle repeater clock to be described in connection with the longitude indicating apparatus, can be employed for driving the bearing motors, for example, when it is desired to utilize this source or when a more suitable source of current is not available.

I claim:

1. In apparatus for indicating geographic positions in terms of latitude, a neutrally mounted gyroscope having the plane of its spinning disc normally parallel with the plane of the Equator, a housing for said gyroscope, a ring surrounding said housing and rotatably connected therewith, electrically operated follow-up mechanism for causing said ring to assume a plane bearing a definite relationship with the plane of the spinning disc of said gyroscope, said follow-up mechanism being under the control of the gyroscope, a second ring surrounding said first ring, follow-up mechanism for moving said second ring into a plane bearing a definite relationship with a plane perpendicular to the earth's horizontal, said last mentioned follow-up mechanism being under the control of a gyrocompass, and means for indicating the angle between said two rings.

2. In apparatus for indicating geographic positions in terms of latitude, a neutrally mounted gyroscope having the plane of its spin disc normally parallel with the plane of the Equator, a housing for said gyroscope, a ring surrounding said housing and rotatably connected therewith, follow-up mechanism for causing said ring to assume a plane bearing a definite relationship with the plane of the spin disc of said gyroscope, said follow-up mechanism being under the control of the gyroscope, a second ring surrounding said first ring, follow-up mechanism for moving said second ring into a plane bearing a definite relationship with a plane perpendicular to the earth's horizontal, and means for indicating the angle between said two rings.

3. In a gyroscopic apparatus, a pair of gimbal rings, a trunnion carried by one of said rings, a pair of separate rotatable members journaled to said trunnion and upon which the second ring is journaled, and means for simultaneously rotating both of said members in opposite directions.

4. In a gyroscopic apparatus, a pair of gimbal rings, a trunnion carried by one of said rings, a pair of independently rotatable members journaled to said trunnion and upon which the second ring is journaled, and means including a single electric motor serving to simultaneously rotate both said members in opposite directions.

5. In a gyroscopic apparatus, a pair of gimbal rings, a trunnion carried by one of said rings, a pair of separate rotatable members journaled to said trunnion and upon which the second ring is journaled, and means for simultaneously rotating said members in opposite directions, said last means including an electric motor having its stator carried by the second ring and its rotor carried by one of said members, and planetary gearing interconnecting said members and having elements thereof carried by said second ring.

6. In apparatus for indicating geographic positions in terms of the earth's co-ordinates, a pair of gimbal rings having a direct pivotal connection between the same on a vertical axis, the outer one of said rings being adapted to be maintained in a vertical plane fixed relative to the carrier, motive means acting between said rings for maintaining the other ring in a plane perpendicular to the earth's instantaneous north-south horizontal, a support, means for connecting the support with the outermost one of said rings and for affording three degrees of freedom between said support and said one ring, a gyroscope, and means supporting the gyroscope for three degrees of freedom in the inner one of said rings.

7. In apparatus of the character described, a gyroscope adapted to be set into operation with its spin axis parallel to the earth's north and south polar axis, the gyroscope having a housing, a gimbal ring connected to the housing by normally horizontal trunnions at right angles to the spin axis, a second gimbal ring connected to the first gimbal ring by trunnions at right angles to the first trunnion and the spin axis, motive means for applying forces between said gimbal rings, selective means responsive to movement of the device over the earth's surface for controlling operation of said motive means to limit oscillations of the gyroscope, follow-up means for maintaining the first ring in the plane of the gyroscope's spin disc, a support, and means supporting the second ring in the support to afford three degrees of freedom to said second ring.

8. In apparatus for indicating geographic positions, a gyroscope, a housing for the gyroscope, a gimbal ring surrounding said housing and rotatably supporting the same on an axis, follow-up mechanism for causing said ring to assume a plane having a definite relationship with the plane of the spin disc of the gyroscope, said follow-up mechanism being under the control of the gyroscope, a second gimbal ring surrounding the first ring and pivotally supporting the same on an axis at right angles to the first axis, follow-up mechanism for moving said second ring into a plane parallel to the plane of the first ring, another non-pendulous gimbal ring pivotally supporting the second gimbal ring and surrounding the same, means for maintaining said last-named gimbal ring in a plane bearing a definite angular relationship with a plane perpendicular to the earth's instantaneous horizontal, a support, and means supporting the last mentioned gimbal ring in the support to have three degrees of freedom.

9. In apparatus for indicating geographic positions, a gyroscope, a housing for the gyroscope, a gimbal ring surrounding said housing and rotatably supporting the same on an axis, follow-up mechanism for causing said gimbal ring to assume a plane bearing a definite relationship with the plane of the gyro-rotor, said follow-up mechanism being under the control of the gyroscope, a second gimbal ring surrounding the first ring and pivotally supporting the same on an axis at right angles to the first axis, follow-up mechanism for moving said second ring into a plane parallel to the plane of the first ring, another gimbal ring pivotally supporting the second gimbal ring and surrounding the same, means for maintaining said last-named gimbal ring in a plane bearing a definite angular relationship with a plane perpendicular to the earth's horizontal, said first-mentioned follow-up mechanism including motive means serving to apply forces between the first and said last-named gimbal rings, a support, and means supporting said last mentioned gimbal ring in the support to have three degrees of freedom.

10. In apparatus for indicating geographic positions, a gyroscope, a housing for the gyroscope, a gimbal ring surrounding said housing and rotatably supporting the same on an axis, follow-up mechanism for causing said ring to assume a plane bearing a definite relationship with the plane of the gyro-rotor, said follow-up mechanism being under the control of the gyroscope, a second gimbal ring surrounding the first ring and pivotally supporting the same on an axis at right angles to the first axis, follow-up mechanism for moving said second ring into a plane perpendicular to the plane of the first ring, a third gimbal ring pivotally supporting the second gimbal ring, means for maintaining said third gimbal ring in a plane bearing a definite angular relationship with a plane perpendicular to the earth's horizontal, a fourth gimbal ring surrounding the third gimbal ring and pivotally connected thereto, means for maintaining the fourth gimbal ring in a plane at right angles to the plane of the third gimbal ring, a support, and means affording three degrees of freedom for carrying the last-mentioned gimbal ring on said support.

11. In apparatus for indicating geographic positions, a gyroscope, a housing for the gyroscope, a gimbal ring surrounding said housing and rotatably supporting the same on an axis, follow-up mechanism for causing said ring to assume a plane bearing a definite relationship with the plane of the spin disc of the gyroscope, said follow-up mechanism being under the control of the gyroscope, a second gimbal ring surrounding the first ring and pivotally supporting the same on an axis at right angles to the first axis, follow-up mechanism for moving said second ring into a plane perpendicular to the plane of the first ring, a third gimbal ring pivotally supporting the second gimbal ring on an axis at right angles to the second-named axis and surrounding the same, means for maintaining said third gimbal ring in a plane bearing a definite angular relationship with a plane perpendicular to the earth's horizontal, a fourth gimbal ring surrounding the third gimbal ring and pivotally supporting the same, means for maintaining the fourth gimbal ring in a plane substantially perpendicular to the plane of the third gimbal ring, said first-mentioned follow-up mechanism including motive means applying forces between said third and fourth gimbal rings, said second-mentioned follow-up mechanism including motive means serving to apply forces between said first and second gimbal rings, a support, and means supporting said last mentioned gimbal ring in the support to have two degrees of freedom.

12. In apparatus of the character described, a gyroscope adapted to be set into operation with its spin axis parallel to the earth's north and south polar axis, means serving to carry the gyroscope with respect to a support and permitting three degrees of freedom, oscillation damping means for applying forces to the gyroscope tending to cause the same to precess about an axis lying in its plane, control means for said damping means, and selecting means responsive to oscillation of said gyroscope from normal position to variably adjust said control means in accordance with the heading of the carrying craft.

13. In apparatus of the character described, a gyroscope adapted to be set into operation with its spin axis parallel to the earth's north and south polar axis, means serving to carry the gyroscope with respect to a support and permitting three degrees of freedom, oscillation damping means for applying horizontally directed couple forces to the gyroscope tending to cause the same to precess about an axis lying in its plane, control means for said damping means, and selecting means responsive to oscillation of the gyroscope from normal position to variably adjust said control means in accordance with the heading of the carrying craft.

FLETCHER M. YOUNG.